US010227181B2

(12) United States Patent
Loizeau (10) Patent No.: US 10,227,181 B2
(45) Date of Patent: Mar. 12, 2019

(54) CONVEYOR FOR CONVEYING A LOAD, SEPARATOR DEVICE AND METHOD OF CONVEYING A LOAD (71) Applicant: Interroll Holding AG, Sant' Antonino (CH)

(72) Inventor: Antoine Loizeau, Saint Germain du Princay (FR)

(73) Assignee: INTERROLL HOLDING AG (CH)

(*) Notice: Subject to any disclaimer, the term of this patent is extended or adjusted under 35 U.S.C. 154(b) by 0 days.

(21) Appl. No.: 15/911,408

(22) Filed: Mar. 5, 2018

(65) Prior Publication Data
US 2018/0265305 A1 Sep. 20, 2018

(30) Foreign Application Priority Data

Mar. 14, 2017 (EP) ..................................... 17290039

(51) Int. Cl.
*B65G 47/29* (2006.01)
*B65G 13/00* (2006.01)
(Continued)

(52) U.S. Cl.
CPC .............. *B65G 47/29* (2013.01); *B65G 1/08* (2013.01); *B65G 13/00* (2013.01); *B65G 13/075* (2013.01);
(Continued)

(58) Field of Classification Search
CPC ............ B65G 2205/06; B65G 2205/04; B65G 13/075; B65G 47/8807; B65G 47/8815;
(Continued)

(56) References Cited

U.S. PATENT DOCUMENTS 3,627,092 A * 12/1971 Fleischauer .......... B65G 13/075
193/35 A
4,120,393 A * 10/1978 Motooka ................ B65G 47/29
198/459.7
(Continued)

FOREIGN PATENT DOCUMENTS

EP 2 517 982 10/2012
EP 3 135 616 3/2017

OTHER PUBLICATIONS

European Search Report dated Sep. 29, 2017.

*Primary Examiner* — James R Bidwell
(74) *Attorney, Agent, or Firm* — Gerald E. Hespos; Michael J. Porco; Matthew T. Hespos (57) ABSTRACT A conveyor (1) has rollers (12) for conveying a load (100) along a conveying direction (C). A stop (20) is configured to be arranged in a separating configuration, in which the load (100) is impeded from being conveyed along the conveying direction (C), and a conveying configuration, in which the load (100) can be conveyed along the conveying direction (C). A trigger (30) is configured to move between a triggered position and an idle position. The trigger (30) is configured so that the load (100) moving in the conveying direction (C) onto the trigger (30) moves the trigger (30) out of the idle position and into the triggered position, thereby arranging the stop (20) in the separating configuration. A counter element (50) is configured to move the trigger (30) out of the idle position when the load (100) is conveyed on the rollers (12) against the conveying direction (C).

16 Claims, 3 Drawing Sheets (51) Int. Cl.
*B65G 13/075* (2006.01)
*B65G 47/88* (2006.01)
*B65G 1/08* (2006.01)

(52) U.S. Cl.
CPC .. *B65G 47/8823* (2013.01); *B65G 2201/0267* (2013.01); *B65G 2205/04* (2013.01)

(58) Field of Classification Search
CPC ...... B65G 47/29; B65G 47/26; B65G 47/295; B65G 47/8823; B65G 1/023; B65G 1/08
USPC ............... 198/345.3, 459.6, 459.7; 193/35 A
See application file for complete search history.

(56) References Cited

U.S. PATENT DOCUMENTS

| | | | | |
|---|---|---|---|---|
| 6,439,369 | B1* | 8/2002 | Brown | B65G 47/647 |
| | | | | 193/35 G |
| 6,763,930 | B2* | 7/2004 | Johnson | B65G 47/266 |
| | | | | 193/35 A |
| 7,380,649 | B2* | 6/2008 | Lauyans | B65G 47/8823 |
| | | | | 193/35 A |
| 2007/0295578 | A1* | 12/2007 | Miyamoto | B65G 47/8815 |
| | | | | 198/345.1 |
| 2014/0116838 | A1* | 5/2014 | Ribau | B65G 47/8823 |
| | | | | 193/35 A |
| 2015/0225184 | A1* | 8/2015 | Matsumoto | B65G 47/8823 |
| | | | | 198/459.6 |

* cited by examiner

CONVEYOR FOR CONVEYING A LOAD, SEPARATOR DEVICE AND METHOD OF CONVEYING A LOAD

BACKGROUND

Field of the Invention

The invention relates to a conveyor for conveying a load, a separator device for a conveyor, and to a method of conveying a load.

Description of the Related Art

Conveyors comprising a plurality of rollers are commonly used for transporting and/or conveying loads. The rollers determine a track and/or a conveying surface on which the loads, such as pallets, are transported towards a discharge end of the conveyor, where the loads are unloaded by, e.g., a forklift operator.

In order to enable the forklift operator to easily extract the end load (i.e. the first load reaching the discharge end), in particular by preventing the accumulation of other loads exerting pressure against the end load, a load separator device is commonly used in proximity of the discharge end. The load separator device is configured to isolate at least the end load, located downstream on the conveyor, with respect to the other loads which are waiting upstream.

These separator devices comprise a trigger and a stop, interconnected and/or coupled to each other, e.g. by a pole or a tie-shaped linking rod. The trigger is accommodated at the end of the conveyor and is designed to be actuated by the end load. The stop is used to retain the upstream loads in order to separate them from the load located at the downstream end. This stop is brought into active separating configuration by the trigger when the latter is actuated by the end downstream load and it is deactuated after said downstream load is removed. The removal allows the following load to take its place at the discharge end and actuates, in turn, the pedal as well as the retaining stop for the other loads.

It is an object of the invention to provide an improved conveyor, in particular a more durable conveyor.

SUMMARY

According to an aspect, a conveyor for conveying a load along a conveying direction comprises a plurality of rollers for conveying the load along the conveying direction. A stop is configured to be arranged between a separating configuration, in which the load is impeded from being conveyed along the conveying direction, and a conveying configuration, in which the load can be conveyed along the conveying direction. A trigger is configured to move between a triggered position and an idle position, wherein the trigger is configured so that the load moving in the conveying direction onto the trigger moves the trigger out of the idle position and into the triggered position, thereby arranging the stop in the separating configuration. A counter element is configured to move the trigger out of its idle position when the load is conveyed on the rollers against the conveying direction.

The rollers may be mounted in a frame of the conveyor. The rollers, in particular the tops of the rollers, provide a conveying surface and/or track on which the load(s) may be conveyed. In particular, the top sides of the cylinder mantles of the rollers may be virtually joined to form a conveying surface parallel to a surface defined by the frame. The conveying surface may be substantially horizontally aligned, e.g. comprising a small slope to enable conveying by gravity.

The trigger may be provided as trigger pedal, i.e. as a trigger roller. The trigger is coupled to the stop so that, depending on the position and/or movement of the trigger, the stop is arranged either in its separating configuration or in its conveying configuration. In particular, a movement of the trigger may result in a movement of the stop and/or change of the configuration of the stop. The trigger is movable between the idle position and the triggered position. When the trigger is in the idle position, the separator stop is in the conveying configuration and, thus, not activated.

The conveying configuration of the stop may correspond to a position in which the stop is fully retracted below the conveying surface. Alternatively, the conveying configuration of the stop may correspond to an unlocked configuration of the stop. In this unlocked configuration, the stop may at least partially protrude from the conveying surface. However, a load moving in the conveying direction onto the unlocked stop will move the stop below the conveying surface so that the load can pass the stop. I. e., the unlocked stop may be at least partially pivotable about a stop pivot axis by a load as long as it is arranged in its unlocked, conveying configuration.

In the idle position, the trigger pedal is ready to be activated or engaged by an oncoming load and/or by any sufficient force applied to it. In the idle position, the trigger may at least partially protrude from the conveying surface so that an oncoming load moving onto the trigger moves the trigger down in the triggered position, subsequently triggering a stop-coupling to transmit the applied force to the stop. Thus, the stop is activated, meaning that the stop is arranged in the separating configuration, e.g. locked and/or moved above the conveying surface.

The movement of the trigger out of the idle position may be caused by a load moving along the conveyor and depressing the trigger with its weight. After the trigger has been moved into the triggered position, the trigger may remain in said position, e.g. for a predetermined delaying time span after the load is removed. A spring mechanism and/or other drive mechanism may be provided to enable a movement of the trigger back into its idle position after the load is removed.

The stop may be provided as a separator stop. The stop may be a barrier or abutment that stops the loads by being arranged in their path when in the separating configuration. The conveying position of the stop is the position in which the stop is retracted below the conveying surface and/or unlocked so that it is movable by an oncoming load. Thus, the stop does not impede with the loads when in the conveying position, since the loads are conveyed above and/or on the conveying surface. However, a pivotable stop that is at least partially arranged above the conveying surface even in its separating configuration may be configured to allow only loads moving in conveying direction to pass the stop. The stop may be configured to remain above the conveying surface when a load is arriving at the stop against the conveying direction, e.g. because it may be only pivotable below the conveying surface in conveying direction. Such a stop will always impede a load moving against the conveying direction, even in the conveying configuration.

When a movement is applied to the trigger, e.g. when a pressure or force is exerted on the trigger by a load from a lateral direction, a stop-coupling may amend the configuration of the stop, e.g. arrange the stop from the (e.g. unlocked) conveying configuration in the (e.g. locked) separating configuration. In the locked separating configuration, a movement of the stop (such as a pivoting about the stop pivot axis) below the conveying surface may be inhibited. Furthermore, this may move the stop from a retracted conveying position into a protruding separating position. When in the separating configuration, the stop protrudes above the conveying surface, i.e. beyond the rollers and may not be pushed below the conveying surface by an incoming load. Consequently, the stop may serve as a barrier for a load subsequent to an end load that has activated and/or engaged the trigger. In the separating configuration, the stop impedes loads from passing the stop in the conveying direction. Furthermore, the stop may also impede loads from passing the stop against the conveying direction when in the separating configuration and/or in the conveying configuration.

The trigger may be arranged at a discharge end of the conveyor (corresponding to a downstream end in conveying direction), in particular at a predetermined distance from an end stop of the conveyor that is smaller than a predetermined load length, i.e. a pallet length. The stop may be arranged at a predetermined distance from the end stop of the conveyor that is larger than said predetermined load length. Thus, the first load arranged at the end stop may activate the trigger and, thus, activate the stop before the following load reaches said first load. Therefore, the first load may be unloaded, e.g. by a forklift, without pressure of the following load.

The trigger may be provided as a pivotable trigger. Thus, the trigger may pivot and/or rotate about a trigger pivot axis when subject to pressure or force. In this case, the trigger may be best activated by a load moving along the conveying direction. When a load is moving against the conveying direction onto the trigger, the trigger may be damaged because it is moved against its preferred activating direction. The trigger pivot axis may be substantially parallel to the axes of the rollers of the conveyor.

However, when a load is parked on the conveyor at the discharge end of the conveyor, said load may be moved onto the trigger against the conveying direction. Thus, the trigger may be damaged. This parking of load at the end of the conveyor may, in particular, occur at pick-up lanes conveying pallets as loads.

The counter element is provided to protect the trigger from taking damage when a load is moved onto the trigger against the intended conveying direction. The counter element may be provided as a counter pedal that is coupled to the trigger. A load moving onto the counter element from the discharge end of the conveyor will cause the trigger to move out of its protruding idle position and, thus, reduce the possible damage to the trigger. In other words, the counter element may be provided as "trigger for the trigger" which enables lowering the trigger out of the idle position.

Therein, it may be sufficient that the counter element lowers the trigger to a predetermined degree. It may not be necessary to lower the trigger all the way into the triggered position. It may be sufficient to lower the trigger so that the load moving against the conveying direction may depress the trigger further into the triggered position without damaging the trigger. In other words, the counter element may be configured to lower the trigger at least partially out of the idle position.

The conveyor enables a protection of the trigger and may increase the durability of the trigger.

According to an embodiment the stop is arranged in its separating configuration when the load is conveyed on the rollers against the conveying direction. The load moving against the conveying direction on the conveying surface triggers and/or depresses the counter element. This lowers the trigger and may lead to the trigger being moved fully into its triggered position. The trigger may either be moved by the counter element or by the load arriving from the downstream conveyor end into the triggered position. The movement of the trigger into the triggered position results in the stop being arranged into its separating configuration. In other words, the counter element only causes the trigger to withdraw, while the stop is in the separating configuration impeding further loads from arriving at the discharge end in the conveying direction. This enables easy handling of the load without pressure from further incoming loads. It also prevents the load parked on the conveyor end to be pushed against the conveying direction and further onto the conveying line, because the movement of said load against the conveying direction may also be impeded by the stop.

According to an embodiment, the counter element is arranged downstream of the trigger in the conveying direction. Thus, a load moving along the conveyor against the conveying direction will first arrive at the counter element before it reaches the trigger. Thus, the load actives (and depresses) the counter element before it reaches the trigger, thereby the trigger is at least partially withdrawn from its protruded idle position when the load arrives at the trigger.

According to an embodiment, the counter element is physically coupled to the trigger. This counter-coupling may ensure that a pressure on the counter element is transferred to the trigger. Thus, a movement of the counter element below the conveying surface takes the trigger at least partially along the way down. Similarly, the counter-coupling may also transfer a movement of the trigger to the counter-element, so that a movement of the trigger below the conveying surface takes the counter-element at least partially along the way down. The counter-coupling may be provided by the counter element engaging directly with the trigger. Alternatively, the counter element may also be spaced from the trigger. Then, the counter-coupling may include a rod and/or a wire and/or a spring that transfers the movement of the counter element at least partially to the trigger and/or vice versa.

According to an embodiment, the counter element is movable between a protruding position, in which it protrudes upwards from a conveying surface provided by the rollers, and a depressed position, to which it is moved when depressed by a load moving against the conveying direction onto the counter element. Thus, the counter element may, similar to the trigger and to an embodiment of the stop, move between at least two positions, in one of which (namely the protruding position) it protrudes above the conveying surface and in one of which (namely the depressed position) it is withdrawn below the conveying surface. A spring mechanism and/or other drive mechanism may be provided to enable a movement of the counter element back into its protruding position after the load is removed. However, such a mechanism may be omitted when the trigger is provided with such a mechanism. Then, the movement of the trigger back into the idle position may be partially transferred to the counter element, e.g. via the counter-coupling if applicable.

In a further development of this embodiment, the counter element comprises an oblique surface and/or a rounding protruding substantially obliquely upwards from the conveying surface when the counter element is in the protruding position. In other words, the counter element may comprise a slope and/or a rounding that is arranged so that it promotes the depression of the counter element when the load moves onto the counter element against the conveying direction.

The oblique surface and/or rounding may comprise an upper end that is arranged upstream (further away from the discharge end) of a lower end of the oblique surface and/or rounding. Thus, a load moving against the conveying direction onto the oblique surface and/or rounding of the counter element may easily and/or automatically depress the counter element by its weight.

In another development of this embodiment, the trigger is configured to move the counter element into its depressed position when triggered by the load moving in the conveying direction onto the trigger. Thus, the trigger not only triggers the stop (and arranges the stop in its separating configuration), but the trigger also moves the counter element into its depressed position. This may protect the counter element from being damaged by the load moving onto the protruding counter element in the conveying direction.

According to an embodiment, the counter element is provided as a counter flap coupled to the trigger. The counter flap comprises an oblique surface so that it promotes the depression of the counter element when the load moves onto the counter flap against the conveying direction. The counter flap may be provided from metal to withstand the force applied by the loads moving onto it.

According to an embodiment, one of the counter element and the trigger comprises a recess and the other of the counter element and the trigger comprises a protrusion (e.g. a pin) engaging the recess so that the counter element is coupled to the trigger. For example, the trigger may comprise a pin as protrusion and the counter element the recess or vice versa. The protrusion and the recess may provide a counter-coupling that transfers a force applied to one of the counter element and the trigger to the other. Said force may, e.g., originate from a load moving onto at least one of the trigger and the counter element. The protrusion may be arranged at and/or comprise an axis of extension in a direction that is substantially parallel to the axes of the rollers, e.g. substantially perpendicular to the conveying direction and/or substantially horizontally arranged.

According to an embodiment, the counter element is configured to move the trigger out of its idle position and into an intermediate position, which is arranged between the triggered position and the idle position of the trigger, when the load is conveyed on the rollers against the conveying direction. In the intermediate position, the trigger may be moved at least 20%, preferably at least 40%, more preferably at least 50% of the way from the idle position to the triggered position. In the intermediate position, the load moving against the conveying direction may move onto the trigger without damaging it. Said load may afterwards fully trigger the trigger, e.g. move it all the way into the triggered position by its weight, thereby activating the stop.

According to an embodiment, the counter element is pivotably mounted to a frame of the conveyor. The frame of the conveyor may be the frame to which the rollers are mounted. The counter pivot axis of the counter element may be arranged substantially parallel to the axes of the rollers, e.g. substantially perpendicular to the conveying direction and/or substantially horizontally arranged. Thus, the movement of the counter element between the protruding position and the depressed position may be a pivot movement.

According to an embodiment, the trigger is arranged downstream of the stop in the conveying direction. In other words, the trigger is closer to the discharge end of the conveyor than the stop. A first load moving on the conveying surface in the conveying direction will first pass the stop (e.g. in its retracted conveying configuration or it will move the unlocked stop below the conveying surface), pass the stop, and then move onto the trigger (in its protruding idle position). The first load then pushes the trigger down in its (retracted) triggered position. Thus, the movement of the first load moves the trigger, which in turn arranges the stop in the protruding separating configuration, thereby blocking any further second load to move to the first load. Preferably, the trigger is spaced from the stop by a predetermined distance which is at least as long as a length of a standard load (e.g. a pallet length) in conveying direction. This ensures a safe transition of the stop from the conveying configuration in the separating configuration. However, a load moving along the conveyor against the conveying direction will first arrive at the trigger before it reaches the stop. Preferably, it actives (and depresses) the counter element before it reaches the trigger, thereby the trigger is at least partially withdrawn from its protruded idle position.

According to an embodiment, the trigger comprises a pedal roller. The pedal roller may be moved from its triggered position, in which it functions as any other roller of the conveyor by forming a part of the conveying surface of the conveyor, into its idle position. In the idle position, the pedal roller is moved out of the conveying surface so that the axis of the pedal roller is at least partially arranged above the axes of the other rollers in vicinity of the trigger. In the idle position, the axis of the pedal roller may be arranged substantially parallel to the axes of the other rollers in vicinity of the trigger. Alternatively the pedal roller may be one-sided tiltable. Therein, the pedal roller may be one-sided tiltable out of a substantially parallel to the rollers arranged position. This can be accomplished by arranging the pedal roller so that one end of the pedal roller is fixedly mounted to the frame and the other end of the pedal roller is tiltable. The pedal roller itself is then arranged diagonal to the axis of rotation of the rollers in its idle position.

According to an embodiment, a delayer is configured to delay a movement of the trigger from the triggered position into the idle position. The delayer may delay the arrangement of the stop from the separating configuration into the conveying configuration in order to allow smooth extraction of the (first) load that triggered the trigger. The delayer may comprise an energy storage that gains energy when the trigger is triggered. The energy storage may, e.g., be arranged to power a rotary drive that is impeding the stop from moving into the conveying configuration, e.g. for a predetermined time after the (first) load is removed from the trigger. The rotary drive may drive an axle. The moment of the axle may be used to drive and control the delayer.

The delayer may comprise a restrainer delaying the decrease of the energy in the energy storage, e.g. a clockwork. This elongates a time span during which the rotary drive is powered by the energy storage and impedes the stop from moving into the conveying configuration. The restrainer can be a dampening element, an escapement, or an inertia element. Restraining the energy in the energy storage has the advantage to elongate the time during which the stop is in its separating configuration and therefore providing enough time to unload the downstream load.

According to an embodiment, the conveyor is provided as a pick-up lane. Pick-up lanes are commonly used with pallets moving on the conveying surface that carry goods and/or wares. The pallets may easily by operated by forklifts loading and/or unloading the conveyor.

An aspect relates to a separator device for a conveyor for conveying a load along a conveying direction, comprising:
 a predetermined conveying direction;
 a stop configured to be arranged in a separating position,
  in which the load is impeded from being conveyed along the conveying direction, and a conveying configuration, in which the load can be conveyed along the conveying direction;

a trigger configured to move between a triggered position and an idle position, wherein the trigger is configured so that the load moving in the conveying direction onto the trigger moves the trigger out of the idle position and into the triggered position, thereby arranging the stop in the separating configuration; and a counter element configured to move the trigger out of its idle position when the load is conveyed against the conveying direction.

The separator device may be provided as a separate element that may be mounted to the conveyor. The separator device may comprise a stop-coupling and a counter-coupling that enable transferring forces between the elements of the separator device, e.g. the stop, the trigger and/or the counter element. The separator device may be mounted to a conveyor. The details described in connection with the conveyor according to the first aspect may also apply to the separator device and vice versa.

An aspect relates to a method of conveying a load along a conveying direction on a conveyor, wherein:

the load is conveyed along the conveying direction on a plurality of rollers;

arranging a stop in either a separating configuration, in which the load is impeded from being conveyed along the conveying direction, or in a conveying configuration, in which the load can be conveyed along the conveying direction;

moving a trigger between a triggered position and an idle position, wherein the load moving in the conveying direction onto the trigger in its idle position moves the trigger out of its triggered position, thereby moving the stop into the separating position; and moving the trigger out of its idle position when the load is conveyed on the rollers against the conveying direction onto a counter element.

In particular, the configuration of the stop may be amended during the method from one into the other and vice versa. The method may be carried out with the conveyor according to the first aspect. Thus, all details described in connection with the conveyor may also apply to the method and vice versa.

Herein, the terms upper, lower, below, above, etc. refer to the reference system of the Earth in a mounting position of the subject-matter. The terms downstream and upstream refer to the conveying direction as the preferred direction into which loads are conveyed on the conveying surface towards the discharge end of the conveyor.

The numbers and/or angles given in the claims and the description are not limited to the exact numbers and/or angles, but may include measurement inaccuracies within limits that still enable solving the underlying problem.

The invention is further illustrated in reference to embodiments shown in the figures. Embodiments of the invention are described with reference to the figures. Features of the embodiments shown in the figures may be combined with alternative embodiments. Identical reference numbers may identify identical or similar features of the embodiments.

DETAILED DESCRIPTION

Figure 1A:
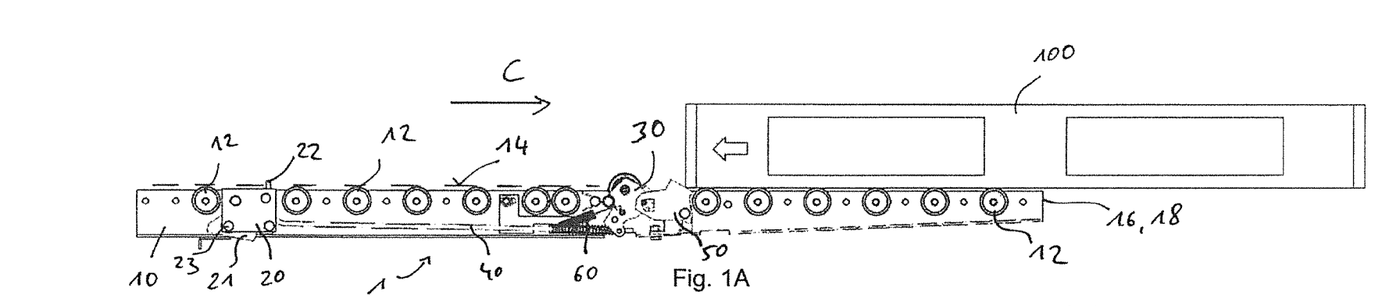
FIG. 1A is a side view of a conveyor on which a load is moved against a conveying direction.

FIG. 1A shows a side view of a conveyor 1 on which a load 100 is moved against a conveying direction C. The conveyor 1 comprises a frame 10 which holds a plurality of rollers 12. The frame 10 may comprise two beams arranged parallel to each other in the conveying direction C. The beams may form a side boundary of the conveyor 1 and may comprise a fixed position. Alternative conveyors may comprise more than two beams and/or one or more cross member(s).

The conveyor 1 comprises an end stop 16 at a discharge end 18 of the conveyor 1. The discharge end 18 is arranged at the downstream end of the conveyor 1 in conveying direction. The end stop 16 may be a profile, which—viewed in cross section—may comprise an end stop for loads moving along the conveying direction C to rest at the discharge end 18.

In the shown embodiment, the end stop is merely provided as an end of the conveyor 100 without any means to stop the oncoming loads. However, in alternative embodiments, the end stop 16 may comprise an abutment and/or a barrier for stopping the incoming loads at the discharge end 18.

An upper surface of the rollers 12 provides a conveying surface 14 which is indicated by a dashed line in FIG. 1A. Loads may rest on the conveying surface 14, e.g. when being conveyed on the rollers 12.

Figure 1B:
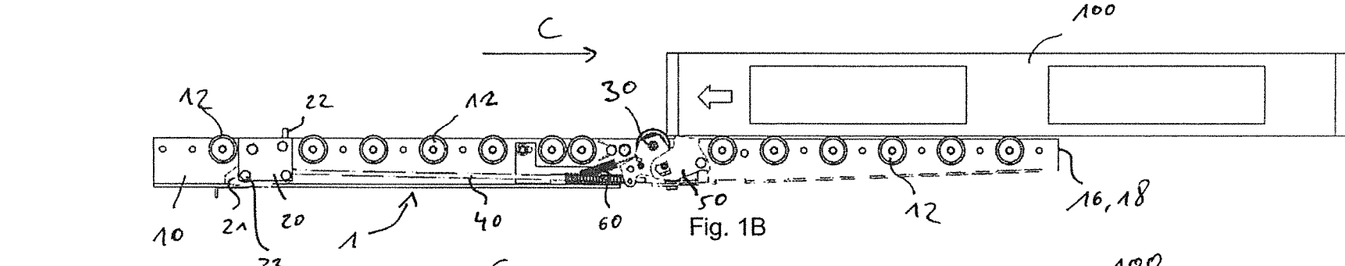
FIG. 1B is a side view of the conveyor on which the load is moved against a conveying direction onto a counter element.
Figure 1C:
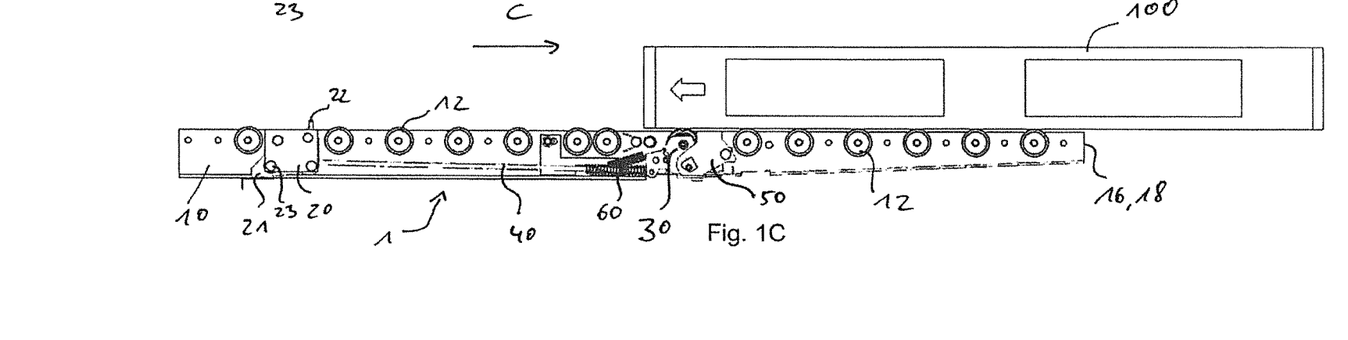
FIG. 1C is a side view of the conveyor on which the load is moved against a conveying direction onto the counter element and a trigger.

In the shown embodiment, the discharge end 18 is shown at the right hand-side of FIGS. 1A to 1C. Loads moving along the conveying direction C arrive from the left side and move towards the discharge end 18 at the right side of the conveyor 1.

The conveyor 1 further comprises a stop 20, a trigger 30, a counter element 50, and a stop-coupling 40. The figures show the load 100 moving against the conveying direction C. However, to illustrate a standard conveying procedure, the handling of a load moving in conveying direction C is described first (which is not shown in the figures).

A load arriving from the left-hand side, corresponding to a load moving on the conveyor 1 in conveying direction C, first arrives at the stop 20 which may be in its conveying configuration as shown in FIG. 1A. In the conveying configuration of the stop 20, a protrusion 22 of the stop 20 may be lowered below the conveying surface 14. In the shown embodiment, the protrusion 22 stop protrudes from the conveying surface 14. However, the stop 20 is unlocked. In its unlocked configuration, a stop lever 21 of the stop 20 may be pivoted about a stop pivot axis 23 of the stop 20. The stop pivot axis is arranged substantially parallel to the axes of the rollers 12. A load moving in conveying direction C will touch the protrusion 22 which may be fixed to the stop lever 21, which will pivot about the stop pivot axis 23 until the protrusion 22 is arranged below the conveying surface 14. In the figures, the stop lever 21 will pivot clockwise about the stop pivot axis 23 when moved by a load moving in conveying direction C. The protrusion 22 may be part of the stop lever 21. The stop lever 21 my be pivotably mounted to the frame 10.

In the conveying configuration, the stop does not impede a load moving on the conveyor 1 in conveying direction C. Rather, in the conveying configuration, the stop enables the load to pass the stop 20, including the protrusion 22.

However, a pivot movement of the stop lever 21 about the stop pivot axis 23 may be blocked when the load 100 is moving against the conveying direction C. A stop may inhibit an (in the figures) anticlockwise pivot movement of the stop lever 21.

After passing the stop 20, the load moving in conveying direction C arrives at the trigger 30. The trigger 30 will then be arranged in its idle position. In the idle position, the trigger protrudes at least partially above the conveying surface 14. The conveying surface 14 will usually be arranged in a substantially horizontal plane. The conveying surface 14 may comprise a slight inclination to enable conveying along the conveying direction C. Said inclination may be arranged at an angle from 0° to 10°, preferably from 2° to 6°, in particular at about 4°.

The load moving in conveying direction C will arrive at the trigger 30 and, since the trigger is protruding above the conveying surface, will move on to the trigger 30, thereby pressing the trigger 30 below the conveying surface 14. The movement of the trigger 30 may be accomplished against the force of a spring mechanism 60. This will trigger the trigger 30. This movement of the trigger 30 is enabled by the weight of the load is coupled via the stop-coupling 40 to the stop 20. As soon as the trigger 30 is depressed and, thus, activated, the stop will be arranged in its locked separating configuration which is shown in FIG. 1C.

In its separating configuration, the stop 20 at least partially protrudes from the conveying surface 14 in a fixed position. In particular, the protrusion 22 of the stop 20 may protrude from the conveying surface 14, thereby inhibiting and/or impeding any incoming load from passing the stop 20. Furthermore, the stop lever 21 will not be allowed to pivot about the stop pivot axis 23 in the separating configuration of the stop 20, because the stop lever 21 is securely locked, e.g. by a bolt and/or other locking means.

The movement of the load in conveying direction C may be finally be stopped at the end stop 16. A front end of the load may abut the end stop 16. In this resting position, the load is still arranged at least partially on top of the trigger 30, thereby depressing the trigger 30 by its weight against the force of the spring mechanism 60. This holds the stop 20 in its separating configuration. This may be accomplished by arranging the trigger 30 at a predetermined distance from the end stop 16 that is smaller than a standard length of the load, e.g. a length of a pallet in conveying direction C. In its resting position, the load may be removed, e.g. by a fork lift from the conveyor 1.

After the load is removed, the trigger 30 is allowed to return from its triggered position, wherein it is depressed below the conveying surface 14 (as shown in FIG. 1C), into its idle position (as shown in FIG. 1A). The return of the trigger 30 into its idle position may be allowed instantly, or it may be delayed by a delayer for a predetermined time.

The trigger 30 may be pivotable about a pivot axis 32 (see FIGS. 2A to 2F). Therefore, the trigger 30 should always be activated by a load moving in the conveying direction C. A load 100 moving against the conveying direction C may damage the trigger 30, because it will apply a force against the preferred pivot direction. In the figures, said preferred pivot direction is clockwise. The counter element 50 enables protection from such a damage. In the following, it is described with reference to the figures how the counter element 50 may protect the trigger 30 from being damaged by a load moving against the conveying direction C.

When handling a plurality of loads, an operator may want to temporarily park a load 100 at the end of the conveyor 1, e.g. at times at which it is not conveying other loads. The conveyor 1 may be provided with a delayer that delays the return and/or release of the stop 20 in its conveying configuration after the load is removed from the trigger 30 for a predetermined delaying time span. This may be exploited to give the operator sufficient time to safely handle the removed load. An operator may exploit the predetermined delaying time span to park the same or another load 100 against the conveying direction C on the conveyor 1, e.g. after the operator realised that he picked up the wrong load. In this predetermined delaying time span, the following load(s) are blocked from progressing along the conveying direction C and from moving towards the discharge end 18 at the stop 20. Therefore, the operator may move the load 100 against the conveying direction C onto the conveying surface 14 during this predetermined delaying time span, as shown in FIG. 1A. Therein, the load 100 is pushed up on the conveying surface 14 from the discharge end 18 towards an upstream position, against the conveying direction C. In FIG. 1A, an end side of the load 100 is shown right before it comes into contact with the counter element 50.

FIG. 1B shows a side view of the conveyor 1 on which the load 100 is moved against the conveying direction C further along on to the counter element 50. The counter element 50 is arranged in the vicinity of the trigger 30. More importantly, the counter element 50 is arranged downstream of the trigger 30 in conveying direction C. Thus, the load 100 moving against the conveying direction C will reach the counter element 50 before the trigger 30. The counter element 50 is movable between at least two positions, namely between a protruding position (as shown in FIG. 1A) and a depressed position (as shown in FIGS. 1B and 1C). In the protruding position, the counter element 50 at least partially protrudes from the conveying surface 14. Thus, the load 100 moving against the conveying direction C will engage and/or interact with the protruding section of the counter element 50. The load 100 will depress the counter element 50 in its depressed position, as shown in FIG. 1B.

In FIG. 1B, the load 100 is only moved on to the counter element 50 and not yet onto the trigger 30. In this position, the counter element 50 has moved the trigger 30 out of its idle position (as shown in FIGS. 1A and 2G). The counter element 50 is coupled to the trigger 30 so that the weight of the load 100 moved on the counter element 50 provides a force to move the trigger 30 downwards and out of its idle position, even against a spring force that holds the trigger 30 in its idle position provided by the spring mechanism 40.

In FIG. 1B, the trigger 30 is arranged in an intermediate position between its idle position and its triggered position. In the intermediate position, the trigger 30 may not yet be fully withdrawn below the conveying surface 14 as in its triggered position. However, in its intermediate position, the trigger 30 may be withdrawn sufficiently to ensure that the load 100 moving further on to the trigger 30 will not apply a force against the pivot direction of the trigger 30.

As shown in FIGS. 1B and 1C, the counter element 50 may be arranged in at least two different kinds of depressed positions. In the first depressed position shown in FIG. 1B, the counter element 50 is pushed by the load 100 to the conveying surface 14 and below. In this first depressed position, the counter element 50 may touch the conveying surface 14. In this first depressed position, there may be friction between the counter element 50 and the load 100. In the second depressed position shown in FIG. 1C, the counter element 50 is held by the trigger 30 (via the trigger coupling as described with reference to FIGS. 2A to 2G) fully below the conveying surface 14. In this second depressed position, there is no friction between the counter element 50 and the load 100, which may reduce the abrasion and improve the conveying of the load(s) 100.

FIG. 1C shows a side view of the conveyor 1 on which the load 100 is moved further onto the counter element 50 and the trigger 30. Here, the weight of the load 100 depresses the trigger 30 further down below the conveying surface 14, thereby triggering the stop 20. The force provided by the weight of the load 100 is transferred via the stop-coupling 40 to the stop 20, thereby bringing the stop 20 into its separating configuration. A counter-coupling between the trigger 30 and the counter element 50 may secure the counter element 50 in its depressed position as long as the trigger 30 is in its triggered position.

In the separating configuration, the protrusion 22 of the stop 20 protrudes above the conveying surface 14 and is locked in this protruding separating position. Thus, the stop 20 impedes both the load 100 from moving further upstream along the conveyor 1 against the conveying direction C and any other load arriving at the stop in conveying direction C (not shown in the figures).

Figure 2A:
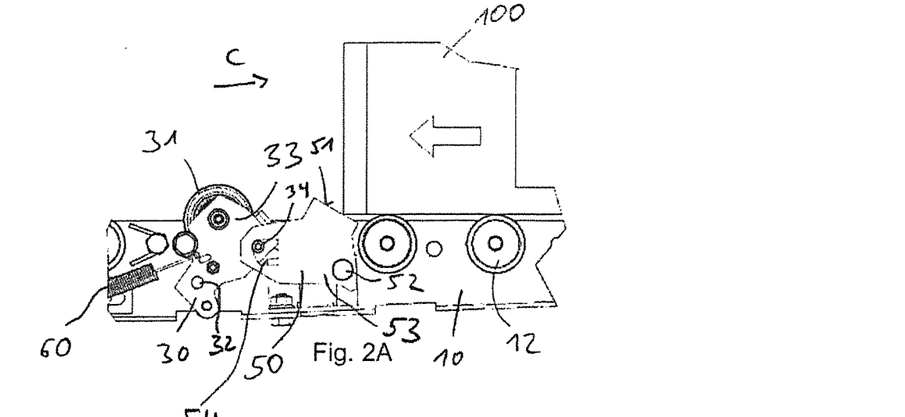
FIG. 2A is a side view of a section of FIG. 1A, showing a section of the conveyor on which the load is moved against a conveying direction.

FIG. 2A shows a side view of a section of FIG. 1A, showing a section of the conveyor 1 on which the load 100 is moved against the conveying direction C. In the situation shown in FIG. 2A, the load 100 is about to reach the counter element 50. The counter element 50 is at least partially pivotable about a counter pivot axis 52. The counter pivot axis 52 is arranged substantially parallel to the axes of the roller and, thus, substantially horizontally and substantially perpendicular to the conveying direction C. In the shown section, the counter element 50 is pivotable clockwise and anticlockwise. The counter element 50 comprises a counter lever 53 that is pivotable about the counter pivot axis 52. which may be provided from metal. The counter lever 53 is provided as a housing arranged at lateral sides of the conveyor 1.

At an upper end, the counter element 50 comprises an oblique surface 51 that protrudes from the conveying surface 14. In the shown side view, the oblique surface 51 is shown as an oblique line. The oblique surface 51 is arranged so that its lower end is closer to the discharge end 18 than its upper end. The upper end of the oblique surface 51 is arranged upstream of the lower end. This oblique arrangement enables the load 100 to move on the lower end of the oblique surface 51 from the downstream direction. This situation is shown in FIG. 2A. Here, the counter element 50 is arranged in its protruding position and the trigger 30 is arranged in its idle position. Not shown in FIG. 2A is the stop 20 which is arranged in its conveying configuration.

The trigger 30 comprises a pedal roller 31 that protrudes from the conveying surface 14 in the idle position shown in FIG. 2A. The pedal roller 31 may be a roller similar to the rollers 12 mounted to the frame 10 of the conveyor 1. In the idle position, the pedal roller 31 may be arranged so that the axis of the pedal roller 31 remains parallel to the axes of the other rollers 12.

However, in an alternative embodiment, the pedal roller 31 may be one sided-tiltable so that its axis is oblique to the axes of the other rollers 12. This may be advantageous because a one sided-tiltable roller may be produced cheaper. In particular, since only one side of the axis has to be mounted movably, the other end may be mounted fixedly like the axis of the other rollers 12.

In conveyors comprising a small tracks, e.g. when the conveyor comprises two or more separate track-lines with rollers, the pedal roller 31 is preferably moved in the idle position with its axis parallel to the axes of the other rollers 12. With small rollers 12, a one sided-tiltable arrangement is not as easily achievable, because of the rather steep inclination being necessary that may cause problems at the fixed mounting side.

The trigger 30 further comprises a trigger lever 33 that is pivotable about the trigger pivot axis 32. The trigger lever 33 may be provided from metal and/or as a housing that holds and/or carries the trigger pedal roller 31. The trigger pivot axis 32, and/or the stop pivot axis 23, and/or the counter pivot axis 52 may be arranged substantially horizontally and/or substantially parallel to the axes of the rollers 12 and/or substantially perpendicular to the conveying direction C.

The trigger 30 comprises a pin 34 as protrusion that is mounted fixedly to the trigger lever 33. The pin 34 may be arranged at a downstream side of the trigger 30. The pin 34 engages a recess 54 within the counter lever 53. The recess 54 may be arranged at an upstream end of the counter lever 53. The pin 34 and the recess 54 provide a counter-coupling of the trigger 30 and the counter element 50. In an alternative embodiment, the trigger lever 33 may comprise the recess and the counter lever 53 may comprise a protrusion engaging said recess.

Figure 2B:
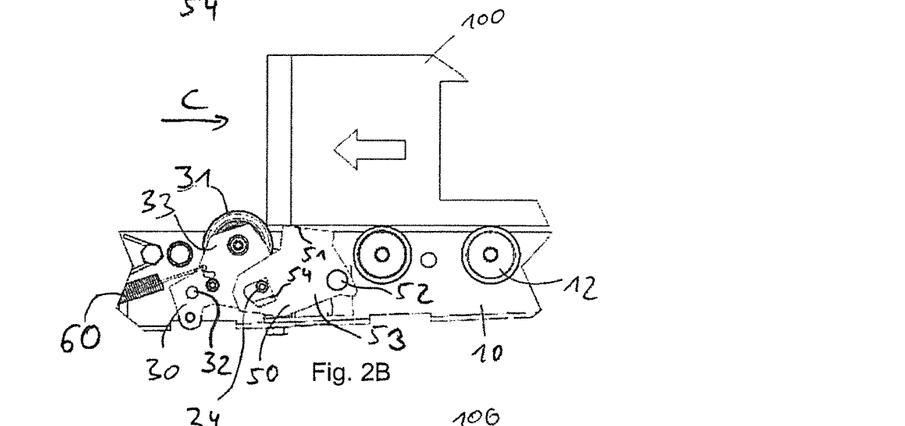
FIG. 2B is a side view of a section of FIG. 1B, showing a section of the conveyor on which the load is moved against a conveying direction onto a counter element.

FIG. 2B shows the same section as FIG. 2A wherein the load 100 has moved further onto the oblique surface 51 of the counter element 50. Thus, the counter element 50 is depressed below the conveying surface 14 by the weight of the load 100. This motion may be a pivot motion, which is anticlockwise in the shown perspective. Thus, the counter element 50 is pivoted anticlockwise about the counter pivot axis 52.

In the shown embodiment, the pivot axis 52 is arranged at a downstream side of the counter element 50. At the counter pivot axis 52, the counter element 50 is mounted to the frame 10. The recess 54 is arranged at an upstream end within the counter lever 53. In other words, the recess 54 is arranged upstream of the counter pivot axis 52. Thus, the recess 54 is moved downwards when the counter element 50 is pivoted about the counter pivot axis 52.

When the recess 54 is moved downwards, also the pin 34 of the trigger 30 is moved downwards because it is engaged within the recess 54. The pin 34 is arranged downstream of the trigger pivot axis 32.

FIG. 2B shows how the trigger 30 is lowered out of the idle position as shown in FIG. 2A. In FIG. 2B, the trigger 30 is lowered into an intermediate position. Therein, a section of the pedal roller 31 still protrudes from the conveying surface but less than in the idle position shown in FIG. 2A. In the configuration shown in FIG. 2B, the trigger 30, in particular the trigger lever 33, is pivoted clockwise about the trigger pivot axis 32 when compared with the configuration shown in FIG. 2A. In the situation shown in FIG. 2B, the load 100 is moved onto the counter element 50 but not yet onto the trigger 30.

Figure 2C:
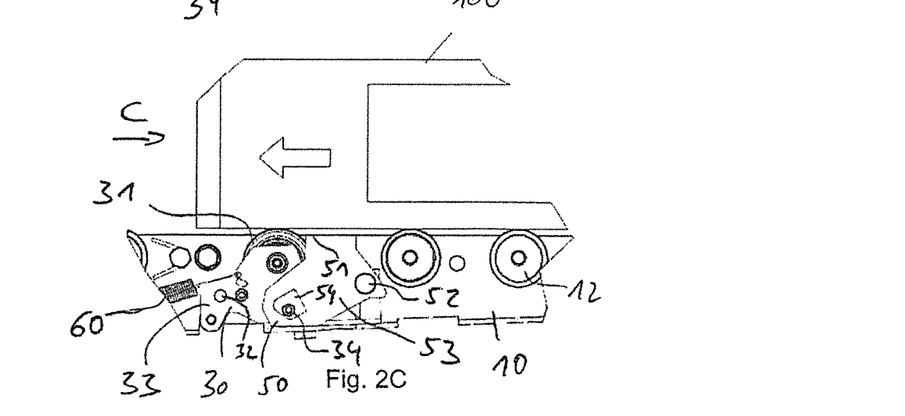
FIG. 2C is a side view of a section of FIG. 1C, showing a section of the conveyor on which the load is moved against a conveying direction onto the counter element and a trigger.

FIG. 2C shows how the load 100 moves further on to the trigger 30, thereby fully depressing the trigger pedal roller 31 below the conveying surface 14. In this configuration, the trigger 30 is triggered and the stop 20 (not shown in FIG. 2C) is arranged in the separating configuration. In this configuration, the trigger 30 is further pivoted downward clockwise so that the pin 34 engaged into recess 45 draws the counter element 50 further down. In this configuration, the oblique surface 51 is substantially horizontally arranged and/or substantially parallel to the conveying surface 14.

Figure 2D:
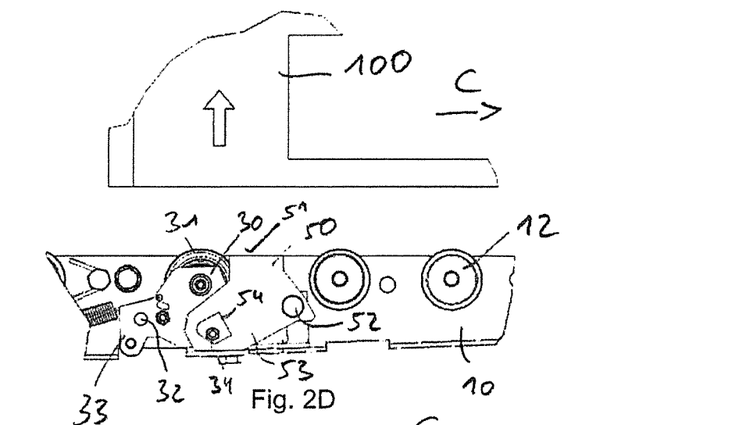
FIG. 2D is a side view of the section of the conveyor from which the load is lifted.

FIG. 2D shows the same section in a configuration wherein the load 100 is lifted from the conveyor. Thus, the weight is removed from both the trigger 30 and the counter element 50. The spring mechanism 60 may apply a force to pivot the trigger 30 back upwards in the idle position. However, said force may yet be inhibited by a delayer.

Figure 2E:
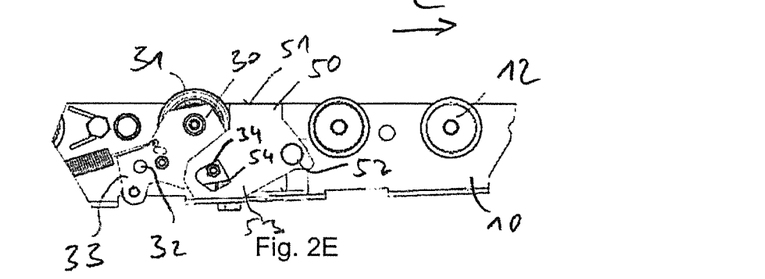
FIG. 2E is a side view of the section of the conveyor wherein a delayer starts releasing the trigger.

FIG. 2E shows the same section a view moments later. Herein, the spring mechanism 60 is trying to push the trigger pedal 31 further upwards towards its idle position. However, the delayer (not shown in the figures) is delaying the return of the trigger 30 in its idle position. Such delayers are commonly known in the art. The delayer may comprise, e.g., a rotary drive that impedes the trigger 30 from returning into its idle position instantly after the load 100 is lifted from the trigger pedal 31. Because the movement of the trigger 30 is, thus, impeded, also the counter element 50 remains in its depressed position because it is coupled via the recess 54 and the pin 34 to the trigger 30.

Figure 2F:
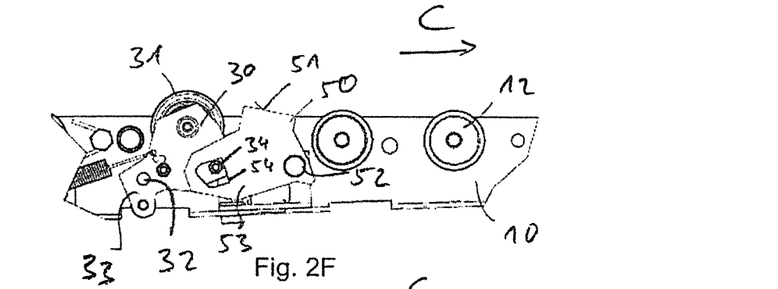
FIG. 2F is a side view of the section of the conveyor wherein the delayer further releases the trigger.
Figure 2G:
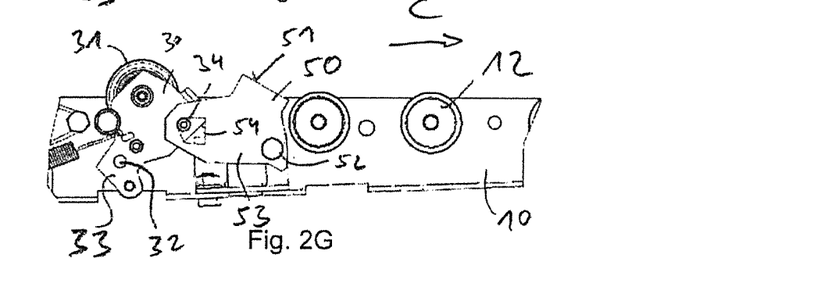
FIG. 2G is a side view of the section of the conveyor wherein the trigger is fully released in its idle position.

FIG. 2F shows the same section of the conveyor 1 another few moments later. Here, the delayer gave some way for the trigger 30 to move further upwards. This also brings the counter element 50 further upwards. However, both the trigger 30 and the counter element 50 are not yet fully released into the idle position and the protruding position, respectively.

FIG. 2G shows the same section after the delayer has fully released the trigger 30. In this configuration, the trigger 30 is again in its idle position (as also shown in FIGS. 2A and 1A). In the idle position, the trigger 30 protrudes at least partially from the conveying surface 14. Also the oblique surface 51 of the counter element 50 is again protruding from the conveying surface 14. In this configuration, the stop 20 is in its conveying configuration and the conveyor 1 is configured for receiving a load 100 either against the conveying direction or in conveying direction C.

Preferably, the conveyor 1 is operating fully mechanically without the need of any motor to drive the movement of the trigger 30, the stop 20, and/or the counter element 50. All these three elements are driven merely from the weight of the load 100.

The delayer may comprise a rotary drive similar to a clockwork that delays the return of the trigger 30 into the idle position after the load is removed.

The stop-coupling 40 may comprise a rod and/or link that is configured to transfer the movement of the trigger 30 to the stop 20.

The counter element 50 may be configured so that it has no impact on the operation of the delayer, in particular to a timer of the delayer that may be adjusted to configure the delaying time of the trigger 30 after removal of the load 100.

LIST OF REFERENCE NUMERALS 1 conveyor
10 frame
12 roller
14 conveying surface
16 end stop
18 discharge end
20 stop
21 stop lever
22 protrusion
23 stop pivot axis
30 trigger
31 pedal roller
32 trigger pivot axis
33 trigger lever
34 pin
40 stop-coupling
50 counter element
51 oblique surface
52 counter pivot axis
53 counter lever
54 recess
60 spring mechanism
100 load
C conveying direction

What is claimed is:

1. A conveyor (1) for conveying a load (100) along a conveying direction (C), comprising:
   a plurality of rollers (12) for conveying the load (100) along the conveying direction (C);
   a stop (20) configured to be arranged in a separating configuration, in which the load (100) is impeded from being conveyed along the conveying direction (C), and a conveying configuration, in which the load (100) can be conveyed along the conveying direction (C);
   a trigger (30) configured to move between a triggered position and an idle position, wherein the trigger (30) is configured so that the load (100) moving in the conveying direction (C) onto the trigger (30) moves the trigger (30) out of the idle position and into the triggered position, thereby arranging the stop (20) in the separating configuration; and
   a counter element (50) configured to move the trigger (30) out of the idle position when the load (100) is conveyed on the rollers (12) against the conveying direction (C).

2. The conveyor of claim 1, wherein the stop (20) is arranged in its separating configuration when the load (100) is conveyed on the rollers (12) against the conveying direction (C).

3. The conveyor of claim 1, the counter element (50) is arranged downstream of the trigger (30) in the conveying direction (C).

4. The conveyor of claim 1, wherein the counter element (50) is physically coupled to the trigger (30).

5. The conveyor of claim 1, wherein the counter element (50) is movable between a protruding position, in which the counter element (50) protrudes up from a conveying surface (14) provided by the rollers (12), and a depressed position, to which the counter element (50) is moved when depressed by the load (100) moving against the conveying direction (C) onto the counter element (50).

6. The conveyor of claim 5, wherein the counter element (50) comprises an oblique surface (51) and/or a rounding protruding substantially obliquely up from the conveying surface (14) when the counter element (50) is in the protruding position.

7. The conveyor of claim 5, wherein the trigger (30) is configured to move the counter element (50) into the depressed position of the counter element (50) when triggered by the load (100) moving in the conveying direction (C) onto the trigger (30).

8. The conveyor of claim 1, wherein the counter element (50) is provided as a counter flap coupled to the trigger (30).

9. The conveyor of claim 1, wherein one of the counter element (50) and the trigger (30) comprises a recess (54) and the other of the counter element (50) and the trigger (30) comprises a protrusion (34) engaging the recess (54) so that the counter element (50) is coupled to the trigger (30).

10. The conveyor of claim 1, wherein the counter element (50) is configured to move the trigger (30) out of the idle position and into an intermediate position that is arranged between the triggered position and the idle position of the trigger (30), when the load (100) is conveyed on the rollers (12) against the conveying direction (C).

11. The conveyor of claim 1, wherein the counter element (50) is pivotally mounted to a frame (10) of the conveyor (1).

12. The conveyor of claim 1, wherein the trigger (30) is arranged downstream of the stop (20) in the conveying direction (C);
and/or
wherein the trigger (30) comprises a pedal roller (31).

13. The conveyor of claim 1, wherein a delayer is configured to delay a movement of the trigger (30) from the triggered position into the idle position.

14. The conveyor of claim 1, wherein the conveyor (1) is provided as a pick-up lane.

15. A separator device for a conveyor (1) for conveying a load (100) along a conveying direction (C), comprising:
a predetermined conveying direction (C);
a stop (20) configured to be arranged in a separating configuration, in which the load (100) is impeded from being conveyed along the conveying direction (C), and a conveying configuration, in which the load (100) can be conveyed along the conveying direction (C);
a trigger (30) configured to move between a triggered position and an idle position, wherein the trigger (30) is configured so that the load (100) moving in the conveying direction (C) onto the trigger (30) moves the trigger (30) out of the idle position and into the triggered position, thereby arranging the stop (20) in the separating configuration; and
a counter element (50) configured to move the trigger (30) out of its idle position when the load (100) is conveyed against the conveying direction (C).

16. A method of conveying a load (100) on a conveyor (1), comprising:
conveying the load (100) along a conveying direction (C) on a plurality of rollers (12);
arranging a stop (20) in either a separating configuration, in which the load (100) is impeded from being conveyed along the conveying direction (C), and a conveying configuration, in which the load (100) can be conveyed along the conveying direction (C);
moving a trigger (30) between a triggered position and an idle position, wherein the load (100) moving in the conveying direction (C) onto the trigger in its idle position moves the trigger (30) out of its triggered position, thereby arranging the stop (20) in the separating configuration; and
moving the trigger (30) out of its idle position when the load (100) is conveyed on the rollers (12) against the conveying direction onto a counter element (50).

* * * * *